No. 762,055. PATENTED JUNE 7, 1904.
C., W. & S. HIBBARD.
VARIABLE SPEED TRANSMISSION AND REGULATOR OR BRAKE.
APPLICATION FILED APR. 27, 1903.
NO MODEL. 2 SHEETS—SHEET 1.
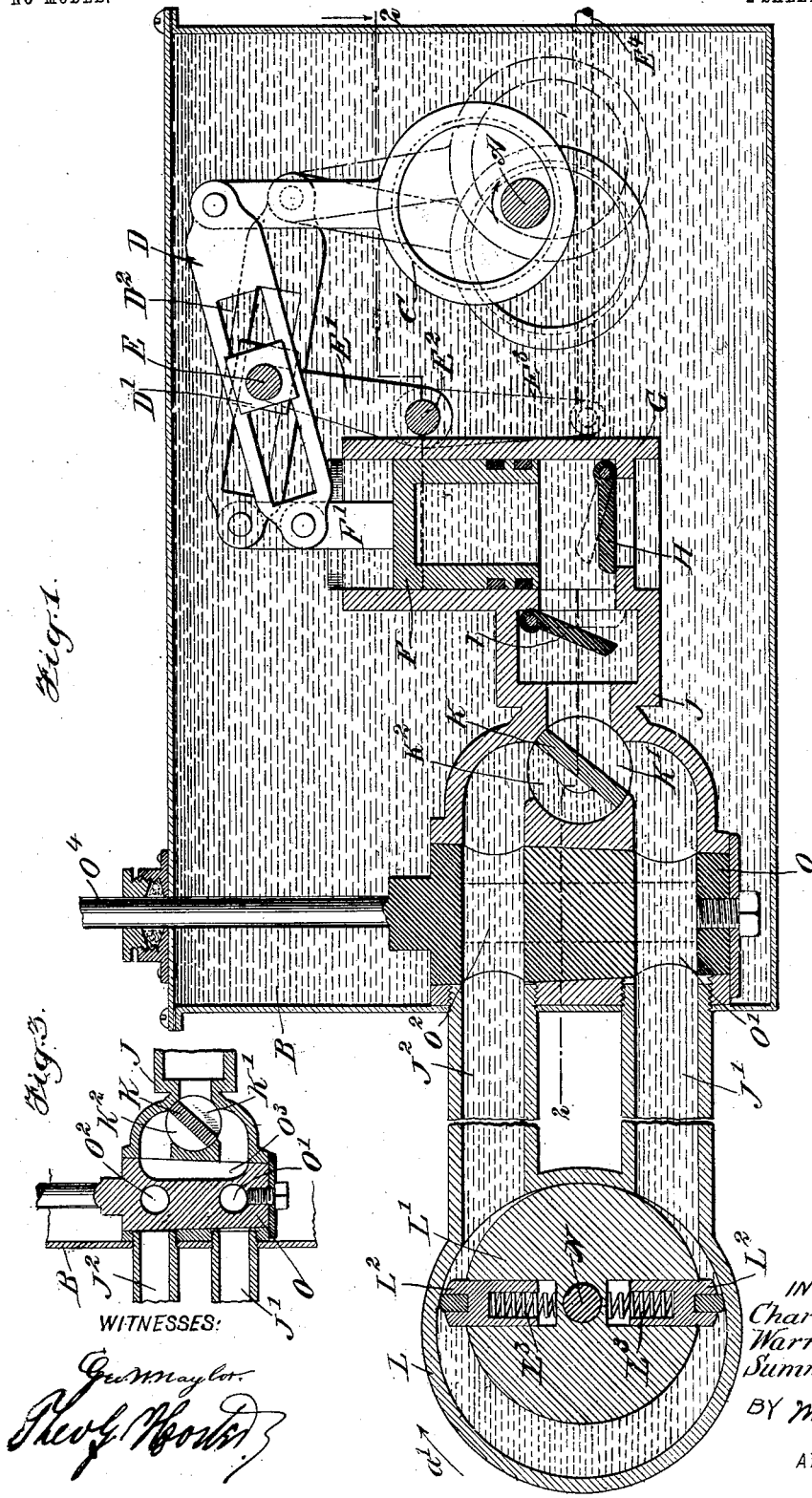
INVENTORS
Charles Hibbard
Warren Hibbard
Sumner Hibbard No. 762,055. PATENTED JUNE 7, 1904.
C., W. & S. HIBBARD.
VARIABLE SPEED TRANSMISSION AND REGULATOR OR BRAKE.
APPLICATION FILED APR. 27, 1903.
NO MODEL. 2 SHEETS—SHEET 2.

INVENTORS
Charles Hibbard
Warren Hibbard
Sumner Hibbard

WITNESSES:

No. 762,055. Patented June 7, 1904.

UNITED STATES PATENT OFFICE.

CHARLES HIBBARD, WARREN HIBBARD, AND SUMNER HIBBARD, OF SANDYHILL, NEW YORK.

VARIABLE-SPEED TRANSMISSION AND REGULATOR OR BRAKE.

SPECIFICATION forming part of Letters Patent No. 762,055, dated June 7, 1904.

Application filed April 27, 1903. Serial No. 154,475. (No model.)

*To all whom it may concern:*

Be it known that we, CHARLES HIBBARD, WARREN HIBBARD, and SUMNER HIBBARD, citizens of the United States, and residents of Sandyhill, in the county of Washington and State of New York, have invented a new and Improved Variable-Speed Transmission and Regulator or Brake, of which the following is a full, clear, and exact description.

The object of the invention is to provide a new and improved variable-speed transmission and regulator or brake for use on automobiles and other machinery, and arranged to insure an easy transmission of the power of the motor to the shaft to be driven without shock or jar, to permit the operator to quickly reverse and to use the device as a brake, and to enable the operator to vary the speed of the driven shaft independent of the speed of the motor, and to allow stopping the driven shaft without stopping the motor.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a sectional plan view of the same on the line 2 2 of Fig. 1, and Fig. 3 is a sectional side elevation of the controlling-valve in a different position.

The main shaft A of a motor of any approved construction extends into a tank B, filled with oil or other suitable liquid, and on the said shaft, within the tank B, are arranged eccentrics C, connected with rocking levers D, fulcrumed on a pin E and pivotally connected with the plunger-rods F' of plungers F, mounted to reciprocate in the pump-cylinders G of a multiple pump submerged in the liquid contained in the tank B. As shown in the drawings, three eccentrics and a corresponding number of plungers and pump-cylinders are used, but it is evident that a single pump may be used, if desired.

The suction-valve H of each pump-cylinder G allows the liquid in the tank to pass into the cylinder on the upstroke of the plunger F, and the discharge-valve I of each cylinder G allows the liquid forced under pressure out of the cylinder on the downstroke of the plunger F to pass into a connection J, containing a reversing-valve K, from which lead branch pipes J' and $J^2$ to the casing L of a rotary motor, having a piston L' secured on the shaft N to be driven, the said piston L being eccentric in the casing L and provided with piston-heads $L^2$ in contact with the inner surface of the casing L by the action of springs $L^3$. (Shown in Fig. 1.) The piston L' contacts at its peripheral face with the interior of the casing L between the branch pipes J' $J^2$, so as to form an abutment, and hence when the valve K is in the position shown in Fig. 1 and the pumps are in action, then the liquid is forced through the connection J by way of the valve K into the branch pipe J', to then pass into the casing L and act on the piston-heads $L^2$ to rotate the piston L' and shaft N in the direction of the arrow $a'$. When the valve K is reversed, then the liquid flows under pressure by way of the valve K and branch pipe $J^2$ into the casing L to act on the piston-heads $L^2$ therein to turn the piston L' and the shaft N in the inverse direction of the arrow $a'$.

The reversing-valve K is provided on one side with a cut-out portion K' for establishing connection with either of the branch pipes J' or $J^2$, as described, and the other side of the valve K is provided with a cut-out portion $K^2$, likewise adapted to register with either of the branch pipes J' or $J^2$, the said cut-out portion $K^2$ opening at one end into the tank B, so that the liquid on its return flow from the casing L by way of either pipe $J^2$ or J' flows by the cut-out portion $K^2$ back into the tank B.

The reversing-valve K is under the control of the operator, and for this purpose its valve-stem $K^3$ extends to the outside of the tank B to be within convenient reach of the operator by a suitable handle or lever connection. (Not shown.)

In the branch pipes J' and J² between the reversing-valve K and the casing L is arranged a controlling-valve O, likewise under the control of the operator and provided with two ports O' and O² and a transverse by-pass O³, of which the ports O' and O² are adapted to connect the ends of the branch pipes J' and J² with each other for the flow of the liquid to and from the casing L, as above described, and shown in Fig. 1.

Now when the controlling-valve O is given a quarter-turn, as shown in Fig. 3, then the ports O' and O² disconnect the ends of the branch pipes J' and J²; but the by-pass O³ now connects the ends adjacent to the valve K with each other, so that the liquid forced by the pump through the connection J flows past the valve K and the by-pass O³ back into the tank without first passing to the motor-casing L, so that the piston L' is not actuated, and the piston-heads L² therein retard the rotation of the shaft N, as the piston-heads now press against the liquid confined in the casing L and the ends of the branch pipes J' J² cut off by the controlling-valve O. The latter has its stem O⁴ extending to the outside of the casing of the tank B to be within convenient reach of the operator for turning the said valve to the position desired.

It will be understood from the foregoing that by partly turning the controlling-valve O the ports O' may be moved partly in register with the branch pipes and at the same time with the by-pass O³, so that only part of the liquid passes to the motor to act on the piston-heads L², while the remaining part of the liquid flows through the by-pass O³ and valve K back into the tank B without doing any work.

From the foregoing it will be seen that the liquid is used over and over again, and as oil is preferably used it is evident that the various parts of the device remain well lubricated.

The strokes of the plungers F in the different pump-cylinders G can be regulated at the will of the operator, and for this purpose the pivot-pin E engages blocks D', held slidably in guideways D², formed in the rocking levers D, as plainly shown in Fig. 1, and the said pivot-pin E is held on crank-arms E', secured on a shaft E², journaled in suitable bearings in the sides of the tank B, as indicated in Fig. 2. On one outer end of this shaft E² is secured an arm E³, connected by a link E⁴ or other means with a hand mechanism under the control of the operator, so as to enable the latter to rock the shaft E² to swing the crank-arm E' and its pivot-pin E forward or backward to change the fulcrum of the rocking levers D, so as to give more or less stroke to the plunger F, but, however, maintaining the same stroke of the eccentrics C.

From the foregoing it will be seen that when the strokes of the plungers are reduced, for instance, less liquid is pumped and forced to the motor-casing L, and consequently it takes a longer time for turning the piston L' than when the pump-plungers are run at their maximum strokes. Thus the operator can vary the speed of the shaft N to be driven independent of the speed of the motor to allow stopping the shaft N by turning the controlling-valve O correspondingly without stopping the motor or driven shaft A, and the shaft N can be reversed at any time by the operator turning the reversing-valve K correspondingly.

It is understood that we do not limit ourselves to the particular construction of the pump, motor, or the variable cut-off shown and described, as the said devices may be varied without deviating from the spirit of our invention, and we also do not limit ourselves to the particular use of the device previously mentioned.

Having thus described our invention, we claim as new and desire to secure by Letters Patent—

1. A variable-speed transmitter and regulator, comprising a tank adapted to contain a liquid, a driven shaft extending into the tank, a pump submerged in the liquid of the tank, means for operating the pump from the said shaft, a rotary motor outside of the tank and on the shaft to be driven, pipes leading from the pump out through the tank to the motor, a reversing-valve for directing the liquid from the pump to either of said pipes, said valve having a cut-out portion leading out through its end for discharging the return flow of liquid from the motor through either of said pipes into the tank, and a controlling-valve adjacent to the reversing-valve and having ports for connecting the ends of the pipes with each other, and a by-pass for conducting the liquid forced by the pump back into the tank when the valve is turned to disconnect the ends of said pipes, as set forth.

2. A speed transmitter and regulator, comprising a tank, a pump submerged in the liquid of the tank, means for operating the pump, a rotary motor outside of the tank and connected with the pump by pipes, and a reversing-valve for directing the liquid from the pump to either pipe, said valve having a cut-out portion leading out through its end, whereby the return of the liquid from the motor through either of said pipes will be discharged directly into the tank, as set forth.

3. A speed transmitter and regulator, comprising a tank, a pump in the tank, means for operating the pump, a rotary motor outside of the tank, pipes connecting the pump with the motor, a reversing-valve for directing the liquid from the pump to either pipe and provided with an opening leading into the tank, and a controlling-valve having ports for connecting and disconnecting the ends of the said pipes with each other, and a by-pass for connecting the ends of the said pipes with each other when they have been disconnected by the ports of the valve, as set forth.

4. A power-transmission comprising in combination a tank for containing a liquid, a pump submerged in the liquid, means for actuating the pump, a rotary motor driven by the liquid forced by the pump into the motor, the latter discharging the liquid back into the tank, a reversing-valve in the connection between the pump and motor within the tank, said valve also permitting the liquid from the motor to be discharged directly into the tank, and a controlling-valve in the connection between the pump and the motor, said valve being adjacent to the reversing-valve, and capable of controlling the amount of liquid flowing to the motor, as set forth.

5. A power-transmission comprising in combination a tank for containing a liquid, a pump submerged therein, a rotary motor on the shaft to be driven, a connection between the pump and the said motor, and a reversing-valve in the said connection, within the tank, said valve having a cut-out portion leading out through its end, whereby the liquid may be made to pass in either direction through the motor and back into the tank, as set forth.

6. A speed transmitter and regulator, comprising a tank, a pump in the tank, means for operating the pump, a rotary motor outside of the tank, pipes leading from the pump out through the tank to the motor, a reversing-valve for directing the liquid from the pump to either of said pipes, said valve being provided with an opening leading into the tank for discharging the return flow of the liquid from the pipes into the said tank, and a controlling-valve for establishing communication through said pipes and connecting the ends thereof when communication therethrough is cut off to permit the liquid forced by the pump to pass through the reversing-valve back into the tank, as set forth.

7. A speed transmitter and regulator, comprising a tank, a pump in the tank, means for varying the stroke of the pump, a rotary motor outside of the tank, pipes leading out through the tank to the motor, a connection between the said pipes and pump, a reversing-valve in the connection for directing the liquid from the pump to either of said pipes, said valve having an opening leading out through its end into the tank for discharging the return flow of the liquid from the motor into the said tank, and a controlling-valve having ports and a by-pass, the former for connecting and disconnecting the ends of the pipes with each other, and the latter for connecting the ends of the said pipes when they are disconnected by said ports, as set forth.

8. In a power-transmitter, the combination with a motor, a pump, and a connection between the pump and motor, of a lever, a fulcrum movable on said lever, a crank-arm carrying the fulcrum, means for rocking said crank-arm, a connection between one end of the lever and the pump-plunger, and means connected with the other end of said lever for rocking the same, as set forth.

9. In a power-transmitter, the combination with a motor, a pump, and a valved connection between the pump and motor, of a slotted lever, a pivot-block mounted to slide in the slot of said lever, a crank-arm carrying the pivot-block, means for rocking the crank-arm, a connection between one end of the lever and the pump-plunger, and means connected with the other end of said lever for rocking the same, as set forth.

In testimony whereof we have signed our names to this specification in the presence of two subscribing witnesses.

CHARLES HIBBARD.
WARREN HIBBARD.
SUMNER HIBBARD.

Witnesses:
WILLIAM I. LOCKE,
MICHAEL E. CUSHING.